(12) United States Patent
Kim et al.

(10) Patent No.: US 11,453,314 B2
(45) Date of Patent: Sep. 27, 2022

(54) SEAT ADJUSTMENT APPARATUS FOR VEHICLE

(71) Applicants: HYUNDAI MOTOR COMPANY, Seoul (KR); KIA CORPORATION, Seoul (KR); Daechang Seat Co., LTD—Dongtan, Hwaseong-si (KR); Hyundai Transys Inc., Seosan-si (KR)

(72) Inventors: Mu Young Kim, Osan-si (KR); Sang Do Park, Suwon-si (KR); Ho Suk Jung, Hwaseong-si (KR); Hyeok Seung Lee, Seoul (KR); Chan Ho Jung, Gunpo-si (KR); Jun Young Yun, Osan-si (KR); Myung Soo Lee, Osan-si (KR); Tae Ju Jeong, Ansan-si (KR); Won Yeong Lee, Hwaseong-si (KR); Jun Sik Hwang, Hwaseong-si (KR); Kyeong Ju Kim, Hwaseong-si (KR)

(73) Assignees: HYUNDAI MOTOR COMPANY, Seoul (KR); KIA CORPORATION, Seoul (KR); Daechang Seat Co., LTD-Dongtan, Hwaseong-si (KR); Hyundai Transys Inc., Seosan-si (KR)

( * ) Notice: Subject to any disclaimer, the term of this patent is extended or adjusted under 35 U.S.C. 154(b) by 0 days.

(21) Appl. No.: 17/339,234

(22) Filed: Jun. 4, 2021

(65) Prior Publication Data
US 2022/0105835 A1 Apr. 7, 2022

(30) Foreign Application Priority Data
Oct. 6, 2020 (KR) .................. 10-2020-0129029

(51) Int. Cl.
*B60N 2/02* (2006.01)
*B60N 2/18* (2006.01)
*B60N 2/10* (2006.01)

(52) U.S. Cl.
CPC ......... *B60N 2/1821* (2013.01); *B60N 2/0232* (2013.01); *B60N 2/10* (2013.01); *B60N 2/1803* (2013.01); *B60N 2/1839* (2013.01)

(58) Field of Classification Search
CPC .... B60N 2/1615; B60N 2/0232; B60N 2/164; B60N 2/165; B60N 2/1814
(Continued)

(56) References Cited

U.S. PATENT DOCUMENTS

| | | | |
|---|---|---|---|
| 6,347,778 B1 * | 2/2002 | Koga | B60N 2/164 297/344.13 |
| 6,851,753 B2 * | 2/2005 | Akaike | B60N 2/1685 297/216.16 |

(Continued)

FOREIGN PATENT DOCUMENTS

JP 2009-202844 A 9/2009

*Primary Examiner* — Sarah B McPartlin
(74) *Attorney, Agent, or Firm* — Lempia Summerfield Katz LLC

(57) ABSTRACT

A seat adjustment apparatus for a vehicle includes: a set bracket having a rear part to which a back frame is rotatably connected; and a cushion frame disposed on an upper side of the set bracket and to be tilted by a link mechanism. In particular, the link mechanism includes: a first link member which is hinge-engaged with a front part of the set bracket, connected to a driving unit and supports a front part of the cushion frame to make the front part of the cushion frame ascend and descend by the driving unit; a second link member hinge-engaged with a rear part of the set bracket and the cushion frame to guide the rear part of the cushion frame; and a third link member hinge-engaged with the set bracket and the cushion frame to determine a tilting position of the cushion frame when the cushion frame ascends.

11 Claims, 8 Drawing Sheets

(58) Field of Classification Search
USPC .................................................. 297/344.17
See application file for complete search history.

(56) References Cited

U.S. PATENT DOCUMENTS 7,338,118 B2 * 3/2008 Ichikawa ............. B60N 2/0715
297/216.2
10,384,568 B2 * 8/2019 Lorey .................. B60N 2/1665

* cited by examiner

SEAT ADJUSTMENT APPARATUS FOR VEHICLE

CROSS REFERENCE TO RELATED APPLICATION

This application claims priority to and the benefit of Korean Patent Application No. 10-2020-0129029, filed on Oct. 6, 2020, the entire contents of which are incorporated herein by reference.

FIELD

The present disclosure relates to a seat adjustment apparatus for a vehicle, which can implement a stable posture of an occupant.

BACKGROUND

The statements in this section merely provide background information related to the present disclosure and may not constitute prior art.

In general, front seats on which a driver and an assistant sit and rear seats provided in the rear of the front seats for additional occupants are prepared in a vehicle, and various convenience devices to improve occupants' convenience are installed on the seats.

For example, the convenience device mounted on the seat includes a seat position adjustment device adjusting the position of the seat by moving the seat in back and forth directions in accordance with manipulation by the occupant, a reclining device adjusting the tilt of a seatback, a height device adjusting the height of the seat, or a tilting device adjusting the tilting angle of the seat.

Recently, with the progress of development of an autonomous vehicle, adjustment of the seat position has been applied more broadly. However, we have discovered that the seat using the tilting device in the related art is tilted as a whole, and thus the occupant's lower body and buttocks ascend together. Due to this, in a seat tilting mode, the occupant's sitting height is changed, and this may cause problems that the occupant's sitting posture becomes uncomfortable.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure provides a seat adjustment apparatus configured that when tilting a seat cushion, a front part of the seat cushion ascends and a rear part of the seat cushion descends, and thus the lower body of an occupant does not ascend as a whole to cause the occupant's feet not to float excessively. Through this, the present disclosure can improve convenience through implementation of a stable posture of an occupant without requiring a separate footboard for supporting the occupant's feet.

In one form of the present disclosure, a seat adjustment apparatus for a vehicle may include: a set bracket having a rear part to which a back frame is rotatably connected; and a cushion frame disposed on an upper side of the set bracket, and configured to be tilted by a link mechanism. In particular, the link mechanism includes: a first link member hinge-engaged with a front part of the set bracket and configured to support a front part of the cushion frame, and connected to a driving unit and configured to make the front part of the cushion frame ascend and descend depending on whether the driving unit operates; a second link member hinge-engaged with a rear part of the set bracket, and hinge-engaged with a middle part or a rear part of the cushion frame and configured to guide movement of the rear part of the cushion frame; and a third link member hinge-engaged with the set bracket and the cushion frame between the first link member and the second link member, and configured to determine a tilting position of the cushion frame in case that the cushion frame ascends. In one form, the first link member, the second link member and the third link member are arranged to be spaced apart from each other along a length direction of the set bracket.

The first link member may include: at least one guide link engaged with the front part of the cushion frame and including a first portion extending downward from the front part of the cushion frame, and a second portion formed with a guide slot; and a rotating link having a first end hinge-engaged with the front part of the set bracket and a second end inserted into the guide slot of the at least one guide link.

In one form, the second portion of the at least one guide link may diagonally extend rearward from the first portion of the at least one guide link, and the guide slot may extend in the same direction as an extension direction of the second portion of the at least one guide link. In another form, the rotating link may be installed to be rotated from front to rear in case that the cushion frame ascends.

In other form, the at least one guide link includes a pair of guide links provided on a first side and a second side of the set bracket.

The first link member may further include a connecting link configured to pass through the guide slots of the pair of guide links provided on both sides of the set bracket, and hinge-engaged with the second end of the rotating link.

The driving unit may include a driving motor installed in the front part of the cushion frame; and a power transfer part connected to the driving motor and having a length being varied in a linear direction depending on whether the driving motor operates, and hinge-engaged with the connecting link and configured to make the rotating link move along a guide slot together with the connecting link by moving the connecting link in case that the driving motor operates.

The second link member may have one end hinge-engaged with a higher position than positions of the first link member and the third link member in the rear of the set bracket, and the other end hinge-engaged with the middle part or the rear part of the cushion frame and extending to be curved downward.

A hinge bracket hinge-engaged with the other end of the second link member may be provided on the middle part or the rear part of the cushion frame, and the hinge bracket may be formed to be diagonally tilted downward.

The third link member may diagonally extend forward from the set bracket and may be connected to the cushion frame, and may be formed to be in a tilted state with respect to a front even in case that the cushion frame ascends.

The third link member may be positioned in a center part of the cushion frame and may be hinge-engaged with the set bracket and the cushion frame, wherein in case that the cushion frame ascends, the front part of the cushion frame ascends and the rear part of the cushion frame descends, such that a leg part of an occupant is raised and a hip point of the occupant moves downward.

The third link member may be positioned on the rear part side of the cushion frame and may be hinge-engaged with the set bracket and the cushion frame, wherein in case that the cushion frame ascends, the front part of the cushion frame is tilted at a larger angle than an angle of the rear part, such that a leg part of an occupant is raised, but a hip point of the occupant is maintained.

The third link member may be positioned on the front part side of the cushion frame and may be hinge-engaged with the set bracket and the cushion frame, wherein in case that the cushion frame ascends, the rear part of the cushion frame is tilted at a larger angle than an angle of the front part, such that a hip point of an occupant moves downward, being lower than a height at which a leg part of the occupant is raised.

According to the seat adjustment apparatus for the vehicle having the above-described structure, in case that the seat cushion is tilted, the front part of the seat cushion ascends and the rear part of the seat cushion descends, and thus the lower body of the occupant does not ascend as a whole to cause the occupant's feet not to float excessively. Through this, a separate footboard for supporting the occupant's feet is not required, and convenience is improved through implementation of the stable posture of the occupant.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
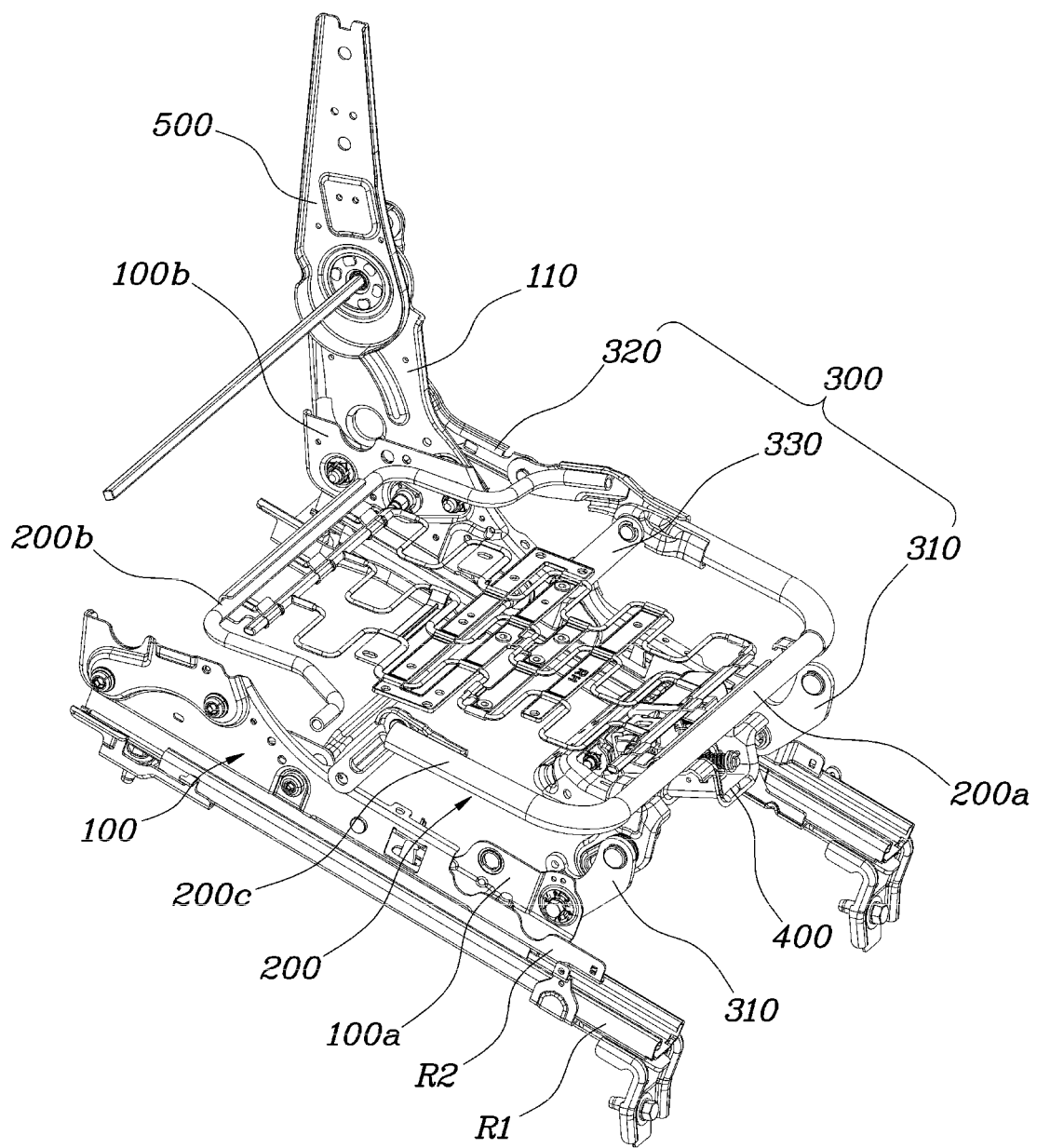
FIG. 1 is a view illustrating a seat adjustment apparatus for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a seat adjustment apparatus for a vehicle according to exemplary forms of the present disclosure will be described with reference to the accompanying drawings.

Figure 2:
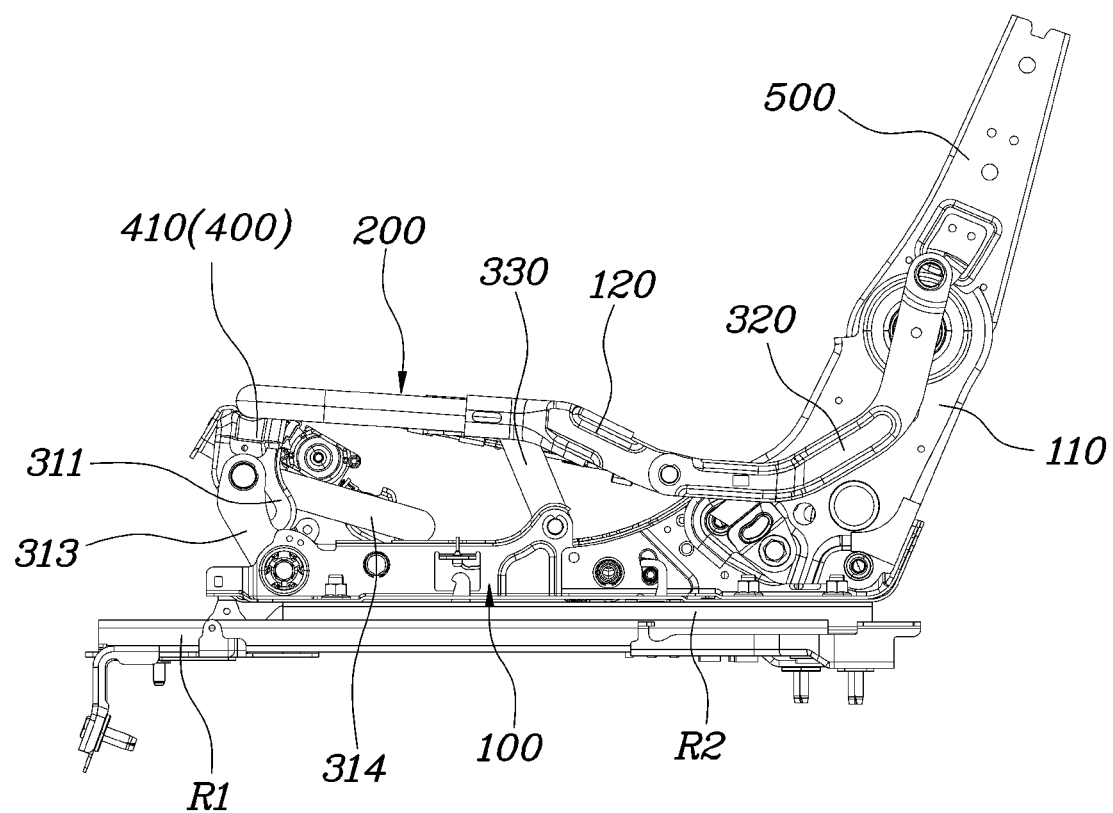
FIG. 2 is a view illustrating a state before an operation of the seat adjustment apparatus for a vehicle illustrated in FIG. 1.
Figure 3:
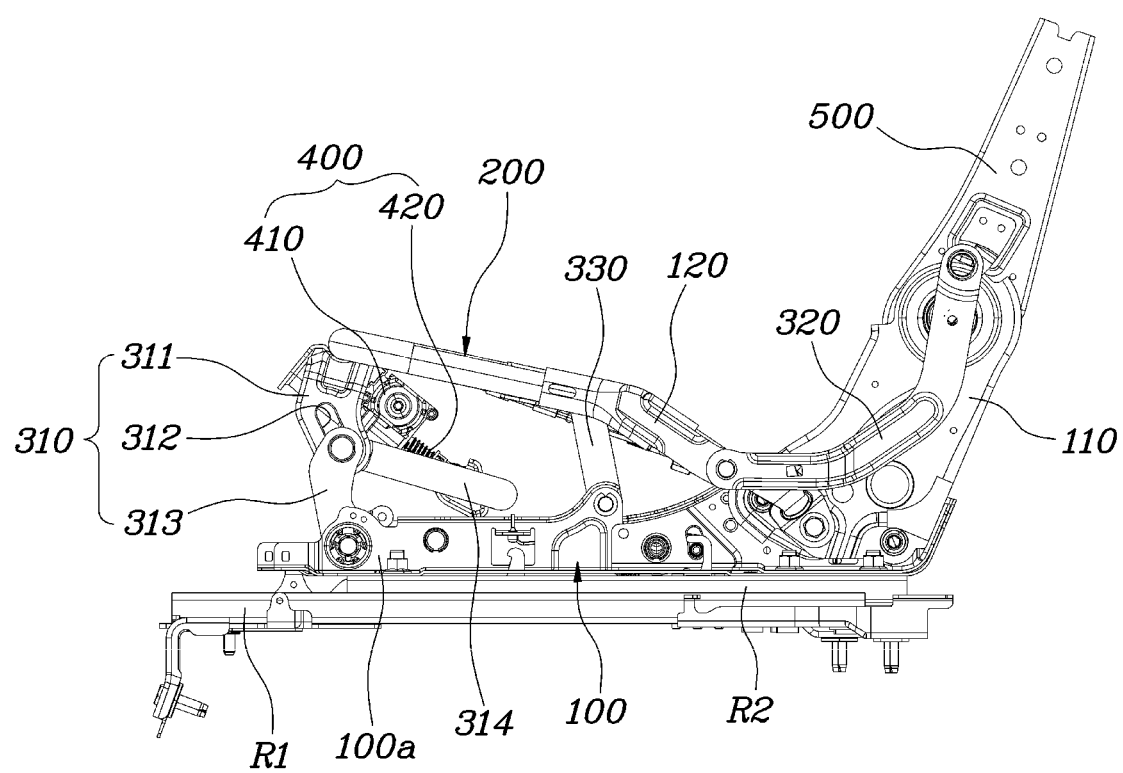
FIG. 3 is a view illustrating a state after an operation of the seat adjustment apparatus for a vehicle illustrated in FIG. 1.
Figure 4:
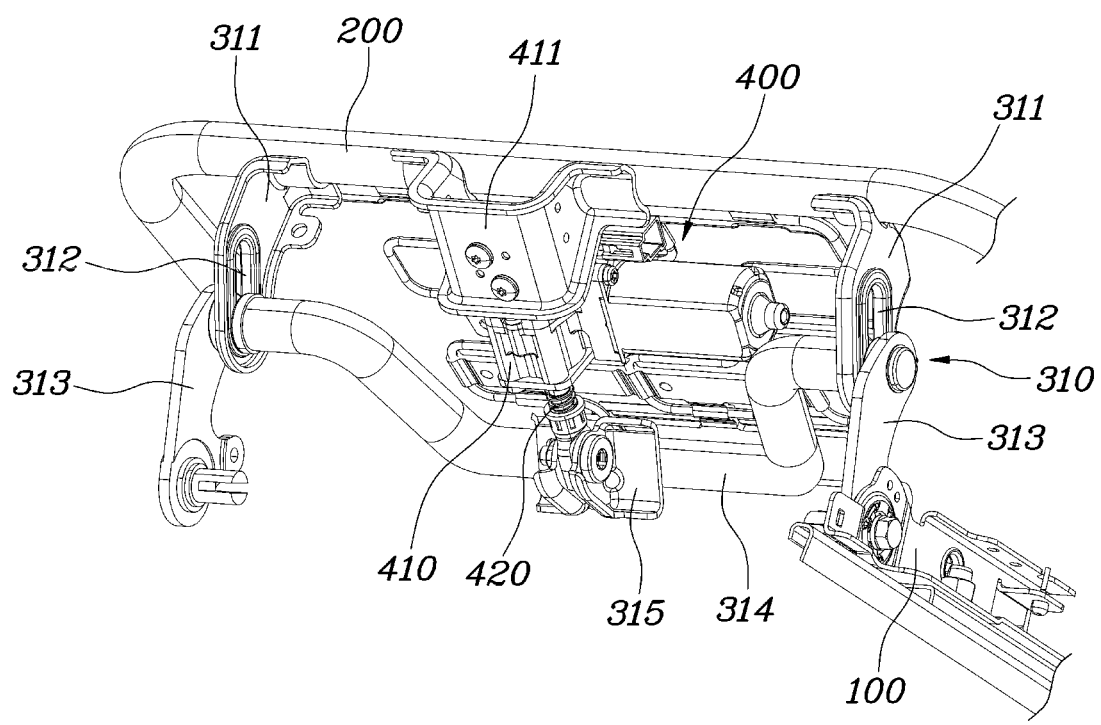
FIG. 4 is a view illustrating a driving unit and a first link member of the seat adjustment apparatus for a vehicle illustrated in FIG. 1.
Figure 5:
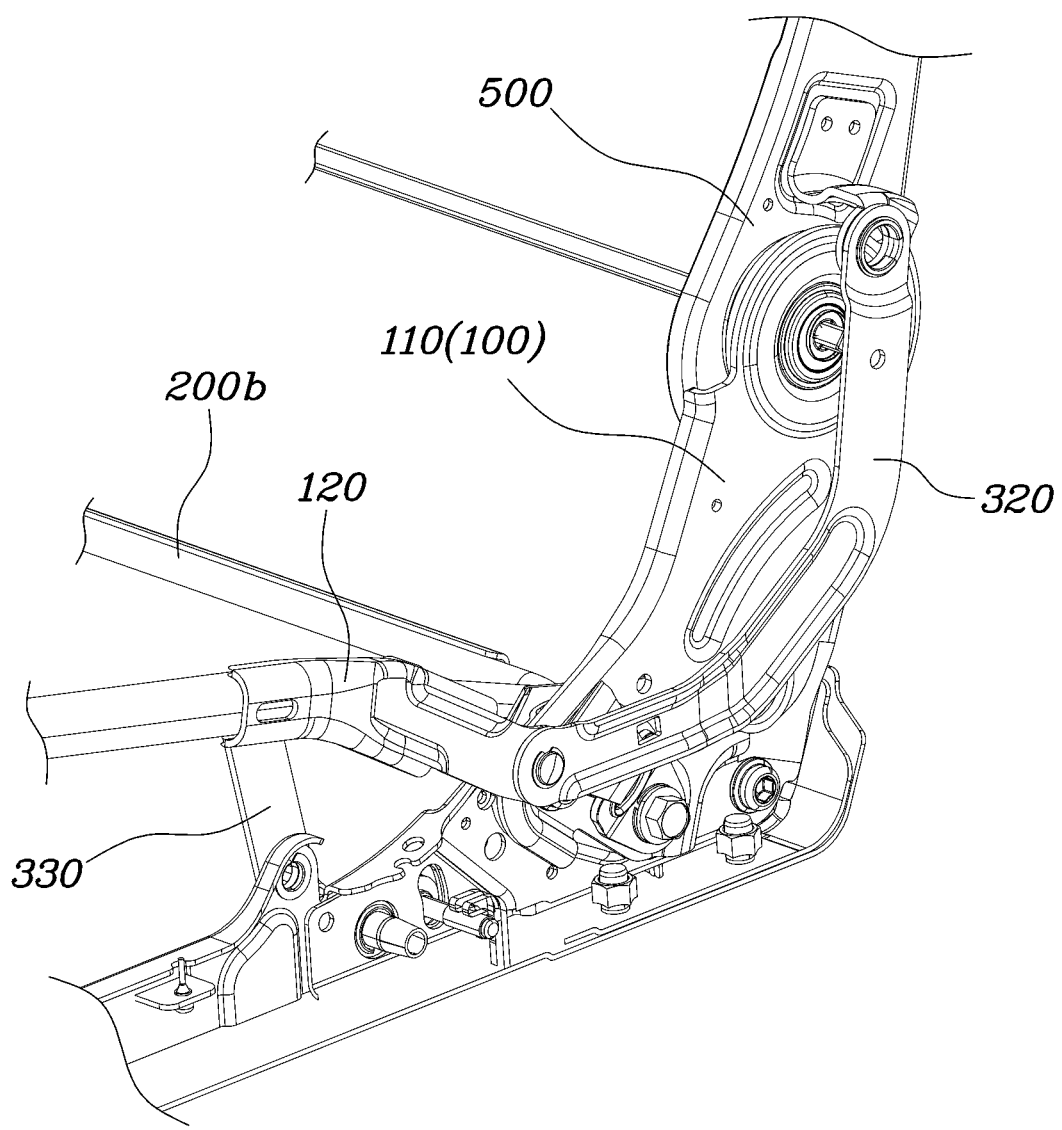
FIG. 5 is a view illustrating a second link member of the seat adjustment apparatus for a vehicle illustrated in FIG. 1.
Figure 6:
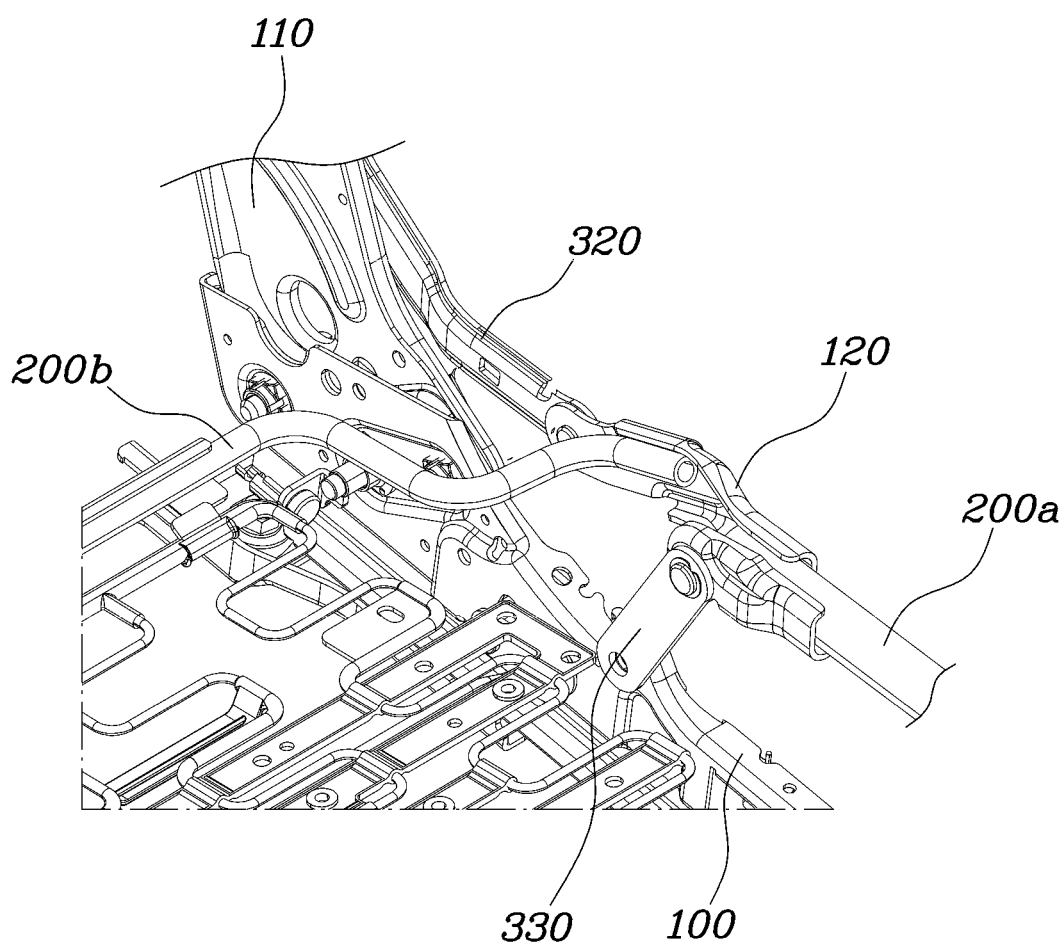
FIG. 6 is a view illustrating a third link member of the seat adjustment apparatus for a vehicle illustrated in FIG. 1.
Figure 7:
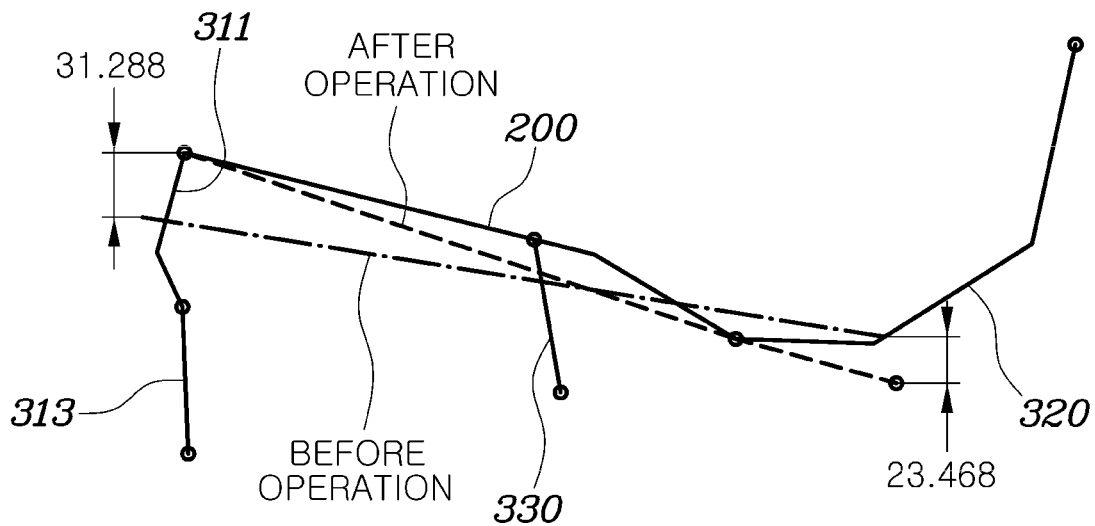
FIG. 7 is a diagram explaining a state before and after an operation in case that a third link member is in a reference position.
Figure 8:
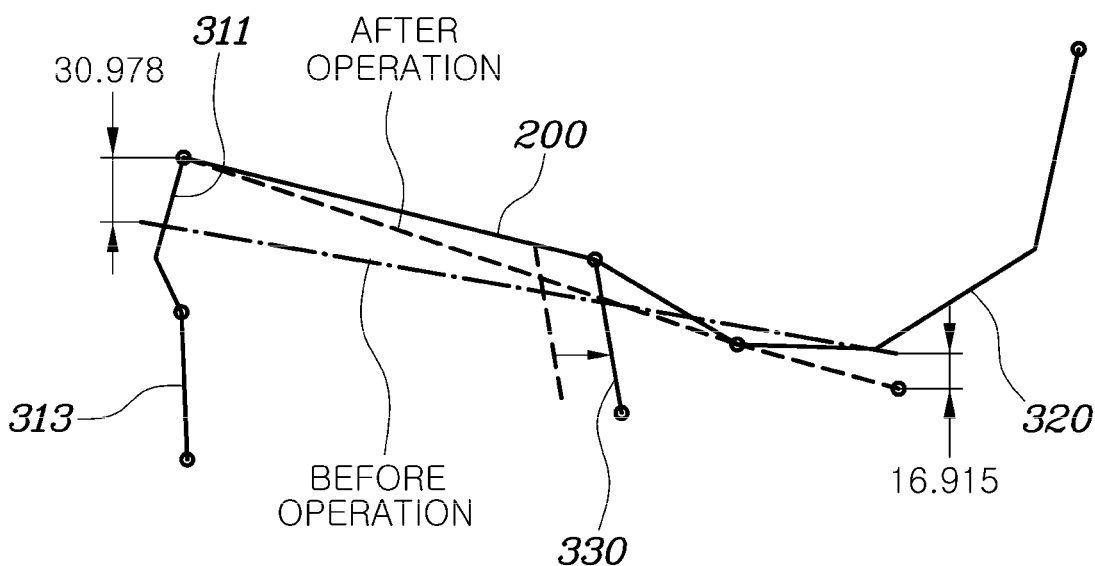
FIG. 8 is a diagram explaining a state before and after an operation in case that a third link member is disposed in the rear in comparison to a reference position.
Figure 9:
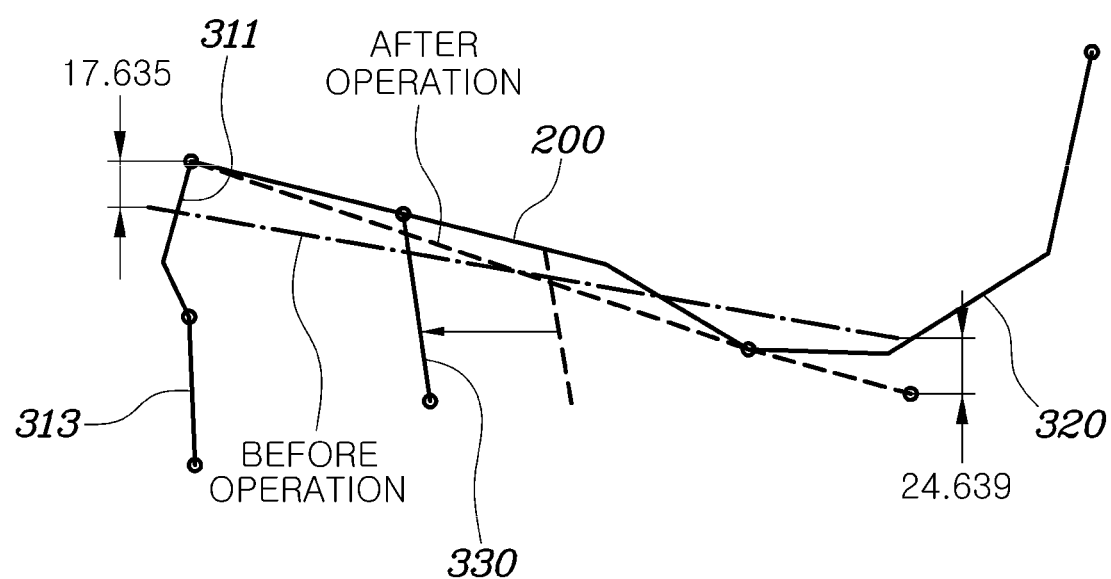
FIG. 9 is a diagram explaining a state before and after an operation in case that a third link member is disposed in the front in comparison to a reference position.

FIG. 1 is a view illustrating a seat adjustment apparatus for a vehicle according to an exemplary form of the present disclosure, FIG. 2 is a view illustrating a state before an operation of the seat adjustment apparatus for a vehicle illustrated in FIG. 1, FIG. 3 is a view illustrating a state after an operation of the seat adjustment apparatus for a vehicle illustrated in FIG. 1, FIG. 4 is a view illustrating a driving unit and a first link member of the seat adjustment apparatus for a vehicle illustrated in FIG. 1, FIG. 5 is a view illustrating a second link member of the seat adjustment apparatus for a vehicle illustrated in FIG. 1, FIG. 6 is a view illustrating a third link member of the seat adjustment apparatus for a vehicle illustrated in FIG. 1, FIG. 7 is a diagram explaining a state before and after an operation in case that a third link member is in a reference position, FIG. 8 is a diagram explaining a state before and after an operation in case that a third link member is disposed in the rear in comparison to a reference position, and FIG. 9 is a diagram explaining a state before and after an operation in case that a third link member is disposed in the front in comparison to a reference position.

As illustrated in FIGS. 1 to 3, the seat adjustment apparatus for a vehicle includes: a set bracket 100 having a rear part 100b to which a back frame 500 is rotatably connected; and a cushion frame 200 disposed on an upper side of the set bracket 100, and configured to be tilted by a plurality of link mechanisms 300 disposed to be spaced apart from each other along a length direction of the set bracket 100.

Here, the set bracket 100 is installed on a moving rail R2 sliding on a fixed rail R1, and moves along the fixed rail R1 together with the moving rail R2. The set bracket 100 may be provided with a base bracket 110 in consideration of the installation position of the back frame 500, and the back frame 500 may be rotatably installed on the base bracket 110 via a recliner.

The set bracket 100 is provided with a plurality of link mechanism 300, and a seat cushion is installed to be able to be tilted via the plurality of link mechanisms 300. Here, the link mechanism 300 may include a first link member 310 hinge-engaged with a front part 100a of the set bracket 100 and configured to support a front part 200a of the cushion frame 200, and connected to a driving unit 400 and configured to make the front part 200a of the cushion frame 200 ascend and descend depending on an operation of the driving unit 400; a second link member 320 hinge-engaged with a rear part 100b of the set bracket 100, and hinge-engaged with a middle part 200c or a rear part 200b of the cushion frame 200 and configured to guide movement of the rear part 200b of the cushion frame 200; and a third link member 330 which is hinge-engaged with the set bracket 100 and the cushion frame 200, and disposed between the first link member 310 and the second link member 320. In particular, the third link member 330 is configured to determine a tilting position of the cushion frame 200 in case that the cushion frame 200 ascends.

That is, since the first link member 310 is hinge-engaged with the front part 100a of the set bracket 100 and supports the cushion frame 200, the set bracket 100 may ascend or descend when the first link member 310 is rotated. The first link member 310 may be rotated by the driving unit 400 installed on the cushion frame 200 or the set bracket 100.

The second link member 320 is hinge-engaged with the rear part 100b of the set bracket 100 and the middle part 200c or the rear part 200b of the cushion frame 200. Through this, when the driving unit 400 operates and the front part 200a of the cushion frame 200 ascends through the first link member 310, the rear part 200b of the cushion frame 200 moves rotatably corresponding to the ascending of the front part 200a, and thus the tilting operation of the cushion frame 200 can be performed.

The third link member 330 is hinge-engaged with the set bracket 100 and the cushion frame 200 and disposed between the first link member 310 and the second link member 320, and determines the tilting position of the cushion frame 200 when the cushion frame 200 ascends. That is, when the cushion frame 200 ascends, the third link member 330 is rotated together with the cushion frame 200 to make the cushion frame 200 be tilted. As described above, since the third link member 330 is rotated together when the cushion frame 200 ascends, the front part 200a of the cushion frame 200 ascends, but the rear part 200b of the cushion frame 200 descends as the ascending of the front part 200a is regulated by the third link member 330.

As described above, when the driving unit 400 operates, the cushion frame 200 performs a tilting operation in which the front part 200a of the cushion frame 200 ascends and the rear part 200b thereof descends by means of the first link member 310, the second link member 320, and the third link member 330, such that an occupant does not ascend as a whole, but only front parts of the occupant's legs ascend, and thus a comfortable sitting posture is maintained.

The present disclosure as described above will be described in detail. As can be seen from FIGS. 2 to 4, the first link member 310 may include a guide link 311 engaged with the front part 200a of the cushion frame 200, extending downward, and having a guide slot 312 formed thereon; and a rotating link 313 having one end hinge-engaged with the front part 100a of the set bracket 100 and the other end inserted into the guide slot 312 of the guide link 311.

As described above, since the first link member 310 includes the guide link 311 and the rotating link 313, and the rotating link 313 moves along the guide slot 312 of the guide link 311 when the rotating link 313 is rotated, the guide link 311 performs a linear motion through the rotating motion of the rotating link 313 to make the cushion frame 200 ascend or descend.

For this, the guide link 311 may include a first portion extending downward from the front part 200a of the cushion frame 200, and a second portion formed with the guide slot. In one form, as illustrated in FIG. 4, the second portion of the guide link 311 diagonally extends rearward from the first portion of the guide link 311, and the guide slot 312 may extend in the same direction as the extension direction of the second portion of the guide link 311. Further, the rotating link 313 may be installed to be rotated from front to rear when the cushion frame 200 ascends. Accordingly, when the driving unit 400 operates, the rotating link 313 is rotated from front to rear, and simultaneously, the guide link 311 is raised by the rotating link 313 that moves along the guide slot 312 to make the cushion frame 200 ascend. Here, when the cushion frame 200 ascends, the rotating direction of the rotating link 313 and the extension direction of the guide link 311 may be opposite to each other, and if so, each link may be exposed to the front of the cushion frame 200, and in this case, the rotating link 313 is formed to be rotated from front to rear, and the guide link 311 is formed to extend rearward.

Meanwhile, the first link member 310 may further include a connecting link 314 configured to pass through a guide slot 312 of each guide link 311 provided on both sides of the set bracket 100, and hinge-engaged with the other end of each rotating link 313. Through this, the first link member 310 provided on both sides of the set bracket 100 can be simultaneously rotated by the connection with the connecting link 314. In the present disclosure, not only a pair of first link members 310 but also pairs of second link members 320 and third link members 330 are provided on both sides of the set bracket 100.

The driving unit 400 rotating the first link member 310 includes a driving motor 410 installed in the front part 200a of the cushion frame 200; and a power transfer part 420 connected to the driving motor 410 and having a length being varied in a linear direction depending on whether the driving motor 410 operates, and hinge-engaged with the connecting link 314 and configured to make the rotating link 313 move along a guide slot 312 together with the connecting link 314 by moving the connecting link 314 rearward when the driving motor 410 operates.

Here, the driving motor 410 may be composed of a motor of which forward and reverse rotation is possible, and may be installed on the cushion frame 200 through a motor bracket 411. The power transfer part 420 may be composed of a rod screw receiving a rotating force transferred from the driving motor 410 and being drawn out or drawn in. Further, the power transfer part 420 may be hinge-engaged with the connecting link 314 via a connecting bracket 315, and may be drawn out rearward when the driving motor 410 operates.

Through this, when the driving motor 410 for moving the cushion frame 200 upward operates, the power transfer part 420 is drawn out in accordance with the operation of the driving motor 410 to push the connecting link 314 rearward, and the rotating link 313 connected to the connecting link 314 is rotated rearward and simultaneously moves along the guide slot 312 of the guide link 311, so that the guide link 311 is raised by the rotating link 313 to make the cushion frame 200 ascend. As described above, by moving the connecting link 314 through one driving unit 400, the guide link 311 and the rotating link 313 provided on both sides of the set bracket 100 are simultaneously rotated, and thus the cushion frame 200 can be stably moved upward.

Meanwhile, as illustrated in FIG. 5, the second link member 320 may have one end hinge-engaged with a higher position than positions of the first link member 310 and the third link member 330 in the rear of the set bracket 100, and the other end hinge-engaged with the middle part 200c or the rear part 200b of the cushion frame 200 and extending to be curved downward.

That is, the second link member 320 may be formed to be curved in a "C" shape, and may have one end hinge-engaged with the base bracket 110 provided on the set bracket 100 and the other end hinge-engaged with the middle part 200c or the rear part 200b of the cushion frame 200 to enable the tilting operation in accordance with the ascending and descending of the cushion frame 200 to be performed. The above second link member 320 makes a rotation point be set in the middle part 200c or the rear part 200b of the cushion frame 200, such that the front part 200a of the cushion frame 200 ascends while the rear part 200b descends. If the second link member 320 is formed simply in a straight line, the second link member 320 is rotated upward together to make the cushion frame 200 ascend forward when the front part 200a of the cushion frame 200 ascends. However, since the second link member 320 of the present disclosure is formed to be curved in the "C" shape, it enables the cushion frame 200 to move rearward when the cushion frame 200 ascends, and thus the ascending operation of the front part 200a and the descending operation of the rear part 200b of the cushion frame 200 can be simultaneously performed.

Here, a hinge bracket 120 hinge-engaged with the other end of the second link member 320 may be provided on the middle part 200c or the rear part 200b of the cushion frame 200, and the hinge bracket 120 may be formed to be diagonally tilted downward. Accordingly, the second link member 320 formed to be curved is connected in a straight line through the hinge bracket 120, such that the second link member 320 can stably support the cushion frame 200 via the hinge bracket 120 with respect to the tilting in accordance with the ascending of the front part 200a and the descending of the rear part 200b of the cushion frame 200 when the cushion frame 200 ascends.

Further, as can be shown in FIG. 6, in case that the front part 200a and the rear part 200b of the cushion frame 200 are separately configured, it is possible to provide a structure in which the hinge bracket 120 connects the front part 200a and the rear part 200b of the cushion frame 200 to each other.

Meanwhile, the third link member 330 may diagonally extend forward from the set bracket 100 and may be connected to the cushion frame 200, and may be formed to be in a tilted state with respect to the front even in case that the cushion frame 200 ascends. Since the third link member 330 diagonally extends forward from the set bracket 100, it guides the rearward movement of the cushion frame 200 while corresponding to the ascending of the front part 200a of the cushion frame 200 when the cushion frame 200 ascends. For this, the third link member 330 may be formed to be shorter than the final length obtained through unfolding of the first link member 310.

The tilting angle of the cushion frame 200 can be adjusted in accordance with the installation position of the third link member 330 between the first link member 310 and the second link member 320.

That is, as illustrated in FIG. 7, since the third link member 330 is positioned in the center part of the cushion frame 200 and is hinge-engaged with the set bracket 100 and the cushion frame 200, the front part 200a of the cushion frame 200 ascends and the rear part 200b of the cushion frame 200 descends when the cushion frame 200 ascends, and thus the occupant's leg part is raised and the hip point of the occupant moves downward.

Here, since the third link member 330 is installed on the center side between the first link member 310 connected to the front part 200a of the cushion frame 200 and the second link member 320 connected to the middle part 200c or the rear part 200b of the cushion frame 200, it enables the front part 200a of the cushion frame 200 to ascend and enables the rear part 200b of the cushion frame 200 to descend when the cushion frame 200 ascends. That is, as shown in FIG. 7, since the third link member 330 regulates the rotation position of the cushion frame 200 when the cushion frame 200 ascends, the front part 200a of the cushion frame 200 ascends by about 31 mm, and the rear part 200b of the cushion frame 200 descends by about 23 mm.

Through this, the occupant's leg part is raised and moves upward, and simultaneously, the occupant's hip point moves downward.

Meanwhile, as illustrated in FIG. 8, since the third link member 330 is positioned on the side of the rear part 200b of the cushion frame 200 and is hinge-engaged with the set bracket 100 and the cushion frame 200, the front part 200a of the cushion frame 200 is tilted at a larger angle than the angle of the rear part 200b when the cushion frame 200 ascends, and thus the occupant's leg part is raised, but the hip point of the occupant is maintained.

That is, in case that the third link member 330 is installed adjacent to the position where the second link member 320 is connected to the cushion frame 200 in the rear part 200b of the cushion frame 200, the front part 200a of the cushion frame 200 ascends, but the rear part 200b makes the descending length relatively small when the cushion frame 200 ascends. Accordingly, as shown in FIG. 8, since the third link member 330 regulates the rotation position of the cushion frame 200 when the cushion frame 200 ascends, the front part 200a of the cushion frame 200 ascends for about 30 mm, and the rear part 200b of the cushion frame 200 descends for about 16 mm.

Through this, the occupant's leg part is raised, but the height of the occupant's hip point is not greatly changed, and thus the position of the hip point can be maintained.

Meanwhile, as illustrated in FIG. 9, since the third link member 330 is positioned on the side of the front part 200a of the cushion frame 200 and is hinge-engaged with the set bracket 100 and the cushion frame 200, the rear part 200b of the cushion frame 200 is tilted at a larger angle than the angle of the front part 200a when the cushion frame 200 ascends, and thus the hip point of the occupant moves downward, being lower than the height at which the occupant's leg part is raised.

That is, in case that the third link member 330 is installed adjacent to the position where the first link member 310 is connected to the cushion frame 200 in the front part 200a of the cushion frame 200, the height at which the front part 200a of the cushion frame 200 ascends is relatively small when the cushion frame 200 ascends, but the descending length of the rear part 200b can be greatly secured.

Accordingly, as shown in FIG. 9, since the third link member 330 regulates the rotation position of the cushion frame 200 when the cushion frame 200 ascends, the front part 200a of the cushion frame 200 ascends for about 17 mm, and the rear part 200b of the cushion frame 200 descends for about 24 mm.

Through this, the occupant's hip point can move downward, being lower than the height at which the occupant's leg part is raised.

As described above, when the cushion frame 200 ascends, the third link member 330 enables the front part 200a of the cushion frame 200 to ascend and enables the rear part 200b of the cushion frame 200 to descend, and by changing the tilting trajectory of the cushion frame 200 in accordance with the installation position of the third link member 330, it is possible to implement an optimum posture matching the seat sitting posture demanded by the occupant.

According to the present disclosure as described above, the cushion frame 200 is initially positioned as illustrated in FIG. 2. Here, as illustrated in FIG. 3, as the driving unit 400 operates during the tilting operation of the cushion frame 200, the front part 200a of the cushion frame 200 ascends by the unfolding operation of the guide link 311 and the rotating link 313 of the first link member 310. In this case, the third link member 330 is also rotated together with the cushion frame 200 and guides the tilting of the cushion frame 200, and as the second link member 320 is rotated, the front part 200a of the cushion frame 200 ascends and the rear part 200b of the cushion frame 200 descends.

Through this, during the seat tilting mode, the occupant's buttocks do not float high, and thus the lower body of the occupant can maintain a stable posture.

According to the seat adjustment apparatus for the vehicle having the above-described structure, when the seat cushion is tilted, the front part of the seat cushion ascends and the rear part of the seat cushion descends, and thus the lower body of the occupant does not ascend as a whole to cause the occupant's feet not to float excessively. Through this, a separate footboard for supporting the occupant's feet is not required, and the convenience is improved through implementation of the stable posture of the occupant.

Although exemplary forms of the present disclosure have been illustrated and described for illustrative purposes, those of ordinary skill in the art will appreciate that various modifications, additions and substitutions are possible, without departing from the scope and spirit of the present disclosure.

What is claimed is:

1. A seat adjustment apparatus for a vehicle, comprising:
    a set bracket having a rear part to which a back frame is rotatably connected; and
    a cushion frame disposed on an upper side of the set bracket, and configured to be tilted by a link mechanism,
    wherein the link mechanism includes:
        a first link member hinge-engaged with a front part of the set bracket and connected to a driving unit, and configured to: support a front part of the cushion frame and make the front part of the cushion frame ascend and descend based on an operation of the driving unit;
        a second link member hinge-engaged with a rear part of the set bracket, and hinge-engaged with a middle part or a rear part of the cushion frame, the second link member configured to guide a movement of the rear part of the cushion frame; and
        a third link member hinge-engaged with the set bracket and the cushion frame and disposed between the first link member and the second link member, the third link member configured to determine a tilting position of the cushion frame when the cushion frame ascends,
    wherein:
        the first link member, the second link member and the third link member are arranged to be spaced apart from each other along a length direction of the set bracket,
        the set bracket is provided with a base bracket,
        the second link member has a first end hinge-engaged with a portion of the base bracket at a position higher than positions of the first link member and the third link member in the rear of the set bracket, and
        a second end hinge-engaged with the middle part or the rear part of the cushion frame and extending to be curved downward.

2. The seat adjustment apparatus according to claim 1, wherein the first link member comprises:
    at least one guide link engaged with the front part of the cushion frame and including a first portion extending downward from the front part of the cushion frame and a second portion formed with a guide slot; and
    a rotating link including:
        a first end hinge-engaged with the front part of the set bracket, and
        a second end inserted into the guide slot of the at least one guide link.

3. The seat adjustment apparatus according to claim 2, wherein:
    the second portion of the at least one guide link diagonally extends rearward from the first portion of the at least one guide link,
    the guide slot extends in the same direction as an extension direction of the second portion of the at least one guide link, and
    the rotating link is configured to rotate when the cushion frame ascends.

4. The seat adjustment apparatus according to claim 3, wherein the at least one guide link includes a single pair of guide links provided on a first side and a second side of the set bracket.

5. The seat adjustment apparatus according to claim 4, wherein the first link member further comprises a connecting link configured to pass through the guide slots of the pair of guide links, and hinge-engaged with the second end of the rotating link.

6. The seat adjustment apparatus according to claim 5, wherein the driving unit comprises:
    a driving motor installed in the front part of the cushion frame; and
    a power transfer part connected to the driving motor and having a length being varied in a linear direction based on an operation of the driving motor,
    wherein the power transfer part is configured to:
        hinge-engage with the connecting link, and
        make the rotating link move along the guide slots together with the connecting link by moving the connecting link when the driving motor operates.

7. The seat adjustment apparatus according to claim 1, wherein a hinge bracket hinge-engaged with the second end of the second link member is provided on the middle part or the rear part of the cushion frame, and the hinge bracket is formed to be diagonally tilted downward.

8. The seat adjustment apparatus according to claim 1, wherein the third link member diagonally extends forward from the set bracket and is connected to the cushion frame, and is formed to be in a tilted state with respect to a front even in case that the cushion frame ascends.

9. The seat adjustment apparatus according to claim 1, wherein the third link member is positioned in a center part of the cushion frame and is hinge-engaged with the set bracket and the cushion frame, and
    wherein when the cushion frame ascends, the front part of the cushion frame ascends and the rear part of the cushion frame descends, such that a leg part of an occupant is raised and a hip point of the occupant moves downward.

10. The seat adjustment apparatus according to claim 1, wherein the third link member is positioned on a rear part side of the cushion frame and is hinge-engaged with the set bracket and the cushion frame, and
    wherein when the cushion frame ascends, the front part of the cushion frame is tilted at a larger angle than an angle of the rear part, such that a leg part of an occupant is raised, but a hip point of the occupant is maintained.

11. The seat adjustment apparatus according to claim 1, wherein the third link member is positioned on a front part side of the cushion frame and is hinge-engaged with the set bracket and the cushion frame, and
    wherein when the cushion frame ascends, the rear part of the cushion frame is tilted at a larger angle than an angle of the front part, such that a hip point of an occupant moves downward, being lower than a height at which a leg part of the occupant is raised.

* * * * *